US007627088B2

(12) United States Patent
Matoba et al.

(10) Patent No.: US 7,627,088 B2
(45) Date of Patent: *Dec. 1, 2009

(54) X-RAY TUBE AND X-RAY ANALYSIS APPARATUS

(75) Inventors: Yoshiki Matoba, Chiba (JP); Yutaka Ikku, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/175,743

(22) Filed: Jul. 18, 2008

(65) Prior Publication Data

US 2009/0028297 A1 Jan. 29, 2009

(30) Foreign Application Priority Data

Jul. 28, 2007 (JP) ............................ 2007-196817

(51) Int. Cl.
*H01J 5/18* (2006.01)
*G01N 23/223* (2006.01)

(52) U.S. Cl. ........................................ 378/140; 378/45

(58) Field of Classification Search .................. 378/42, 378/45, 50, 140, 119, 207
See application file for complete search history.

(56) References Cited

U.S. PATENT DOCUMENTS 6,005,918 A * 12/1999 Harris et al. ................ 378/140
6,118,852 A * 9/2000 Rogers et al. ............... 378/140
6,487,272 B1 * 11/2002 Kutsuzawa .................. 378/140
7,085,353 B2 * 8/2006 Yoshiyama et al. ......... 378/123
2008/0181365 A1 7/2008 Matoba
2009/0041196 A1 * 2/2009 Matoba et al. .............. 378/140

FOREIGN PATENT DOCUMENTS

JP 8-115694 A 5/1996
JP 3062685 B 5/2000

* cited by examiner

*Primary Examiner*—Irakli Kiknadze
(74) *Attorney, Agent, or Firm*—Brinks Hofer Gilson & Lione

(57) ABSTRACT

A vacuumed enclosure has a window formed of an X-ray transmissive material. The vacuumed enclosure encloses an electron beam source for generating an electron beam and a target which, irradiated by the electron beam, generates a primary X-ray. The target is smaller in the outer dimension than the window and located on the center of the window such that it irradiates, through the window, the primary X-ray onto a sample located outside. The vacuumed enclosure further encloses an X-ray detector located such that it can detect a fluorescent X-ray and a scattered X-ray coming from the sample through the window. The X-ray detector generates a signal representative of energy information of the fluorescent X-ray and the scattered X-ray. The vacuumed enclosure further encloses a thermally and electrically conductive metal extending through the target across the widow.

5 Claims, 3 Drawing Sheets

X-RAY TUBE AND X-RAY ANALYSIS APPARATUS

RELATED APPLICATIONS

This application claims priority under 35 U.S.C. §119 to Japanese Patent Application No. JP2007-196817 filed on Jul. 28, 2007, the entire content of which is hereby incorporated by reference.

BACKGROUND OF THE INVENTION

1. Field of the Invention

The present invention relates to an X-ray tube and an X-ray analysis apparatus for use, for example, in an energy-dispersive X-ray fluorescent spectrometer. The X-ray tube and X-ray analysis apparatus are preferably used as small-sized, lightweight, handy or portable apparatus.

2. Description of the Related Art

Fluorescent X-ray analysis is used to perform qualitative or quantitative analysis of a sample by directing primary X-rays emanating from an X-ray source at the sample, detecting fluorescent X-rays released from the sample by an X-ray detector, and obtaining a spectrum from the energies of the fluorescent X-rays. The fluorescent X-ray analysis makes it possible to analyze the sample non-destructively and quickly and, therefore, enjoys wide acceptance in manufacturing process management and quality control.

One analytical method of the fluorescent X-ray analysis is wavelength-dispersive spectrometry in which fluorescent X-rays are spectrally resolved by an analyzing crystal and the wavelengths and intensities of the X-rays are measured. Another analytical method of the fluorescent X-ray analysis is energy-dispersive X-ray spectrometry in which fluorescent X-rays are detected by a semiconductor detector device without spectrally dispersing the X-rays and the energies and intensities of the X-rays are measured by a pulse height analyzer.

A conventional attempt to enhance the sensitivity for fluorescent X-rays is described, for example, in JP-A-8-115694. An X-ray tube is provided with a window to permit fluorescent X-rays passing into the tube to be taken out. The X-ray tube and X-ray analyzer are brought closer to the sample.

As described in Japanese Patent No. 3,062,685, handy energy-dispersive fluorescent X-ray analysis apparatus have become widespread owing to reductions in size of X-ray tubes and X-ray analyzers.

The above-described conventional techniques have the following problems. For example, in the X-ray analysis apparatus described in patent reference 1, the detection sensitivity is effectively enhanced by bringing the X-ray tube and X-ray analyzer closer to the sample. However, the X-ray tube and X-ray analyzer are finite in size and have dimensions greater than given values. Therefore, it has been impossible to bring the X-ray tube and X-ray analyzer infinitely close to the sample.

Furthermore, there is a demand for further reductions in size and weight of conventional handy energy-dispersive fluorescent X-ray analyzers. Because the X-ray tube and X-ray analyzer together occupy the greater parts of the volume and mass of the instrument, restrictions are imposed on further reductions in size and weight if the conventional form is reserved. In addition, in the handy type, a sample to be analyzed is not held in a closed sample chamber. Rather, a sample within the atmosphere is directly irradiated with primary X-rays. That is, the instrument is of open type. Consequently, for safety reasons, the amount of X-rays produced from the X-ray tube is limited. Consequently, it has been necessary to detect fluorescent X-rays from the sample more efficiently.

SUMMARY OF THE INVENTION

In view of the foregoing problems, the present invention has been made. It is an object of the present invention to provide an X-ray tube and an X-ray analysis apparatus which can be made smaller in size and weight and which can detect fluorescent X-rays with enhanced sensitivity.

An X-ray tube that is built according to the present invention to achieve the above-described object has: a vacuum enclosure having a vacuum inside and a window made of an X-ray transmissive film through which X-rays can be transmitted; an electron beam source mounted in the vacuum enclosure and emitting an electron beam; a target irradiated with the electron beam and producing primary X-rays, the target being mounted over a central portion of the window to permit the primary X-rays to be directed at an external sample through the window, the target being smaller in outside diameter than the window; an X-ray detector device disposed in the vacuum enclosure so as to be capable of detecting fluorescent X-rays and scattering X-rays which enter from the window after being released from the sample, the X-ray detector device outputting a signal carrying information about energies of the fluorescent X-rays and scattering X-rays; and a metallic thermal and electrical conductor portion mounted over a part of the window and extending from the target to the vacuum enclosure.

In this X-ray tube, the X-ray detector device that is one component of the X-ray detector is disposed in the vacuum enclosure such that the detector device can detect fluorescent X-rays and scattering X-rays entering from the window. Therefore, the X-ray detector device is accommodated integrally with the electron beam source and the target within the vacuum enclosure, the source being a component of the X-ray tube. Consequently, the whole instrument can be made smaller in size and weight. Furthermore, the X-ray detector device is disposed within the vacuum enclosure. The detector device is placed close to the sample together with the target that produces primary X-rays. Under this condition, detection can be performed. Hence, excitation and detection can be performed very efficiently. Moreover, if the X-ray tube is applied to an open handy type, efficient detection is enabled. Therefore, if the amount of produced X-rays is suppressed more, detection can be performed with high sensitivity. In consequence, high safety can be achieved.

Heretofore, a transmissive X-ray tube having a Be window has been available. The X-ray tube directs an electron beam at a target material placed close to the Be window and permits X-rays emanating from the target material to be outputted to the outside through the Be window. In this transmissive X-ray tube, the target material is vapor deposited substantially over the whole surface of the Be window. If the surface were made of only Be that is easily oxidized, electrical and thermal conductivities would be too low. That is, it is necessary to dissipate away electric charge produced by the target material and generated heat to the enclosure by means of the target material deposited over the whole surface of the Be window. However, if the target material is vapor deposited over the whole surface of the Be window, the transmissivity for fluorescent X-rays emanating from the sample is deteriorated greatly. This makes it difficult to perform accurate detection.

Therefore, in the present invention, a metallic thermal and electrical conductor portion is mounted over a part of the window and extends like belts or rods from the target to the vacuum enclosure. Consequently, electric charge produced by the target in the center of the window and generated heat are transmitted through the thermal and electrical conductor portion and dissipate away to the vacuum enclosure. Fluorescent X-rays are transmitted through the sample at a high rate from the window portions which are not covered with the target material or thermal and electrical conductor portion. The transmitted X-rays can be detected with the inside X-ray detector device. Accordingly, temperature rise of the target can be suppressed and charging can be reduced by the thermal and electrical conductor portion. The fluorescent X-rays can be detected with high efficiency from the window portions which are not covered with the target or thermal and electrical conductor portion.

In one feature of the X-ray tube according to the present invention, the thermal and electrical conductor portion is made of the same material as the target over the window. That is, in the X-ray tube, the thermal and electrical conductor portion is made of the same material as the target over the window. Therefore, it is not necessary to prepare a separate material for fabricating the thermal and electrical conductor portion. Hence, the material cost can be reduced.

In another feature of the X-ray tube according to the present invention, the thermal and electrical conductor portion is made thicker than the target. That is, in the X-ray tube, the thermal and electrical conductor portion thicker than the target is adopted and so high electrical and thermal conductivities are obtained. X-rays can be generated efficiently with the thin target.

An X-ray analysis apparatus according to the present invention has the X-ray tube according to the invention, an analyzer for analyzing the aforementioned signal, and a display portion for displaying the results of the analysis performed by the analyzer. That is, in the X-ray analysis apparatus, the whole apparatus can be made smaller in size because the X-ray tube according to the invention is incorporated.

In the X-ray analysis apparatus according to the invention, the analyzer and display portion are mounted in the vacuum enclosure, and the apparatus is made portable. That is, in the X-ray analysis apparatus, the analyzer and display portion are integrally mounted in the vacuum enclosure, and the apparatus is portable. Therefore, the analyzer and display portion permit the results of analysis to be checked on the spot. Furthermore, the apparatus can be made small in size and handy.

The present invention yields the following advantages. According to the X-ray tube and X-ray analysis apparatus associated with the present invention, the X-ray detector device is disposed in the vacuum enclosure in such a way that the detector device can detect fluorescent X-rays and scattering X-rays entered from the window. Therefore, the whole apparatus can be further reduced in size and weight. Additionally, excitation and detection can be performed more efficiently. The metallic thermal and electrical conductor portion is mounted over a part of the window and extends from the target to the vacuum enclosure. Hence, temperature rise of the target can be suppressed and electrical charging can be reduced. Fluorescent X-rays can be detected efficiently from the window portions not covered with the target or thermal and electrical conductor portion. Accordingly, if the present invention is applied to an open handy-type X-ray analysis apparatus, X-rays can be detected with high sensitivity if the amount of produced X-rays is suppressed. As a consequence, high safety can be achieved.

DESCRIPTION OF THE PREFERRED EMBODIMENTS

Figure 1:
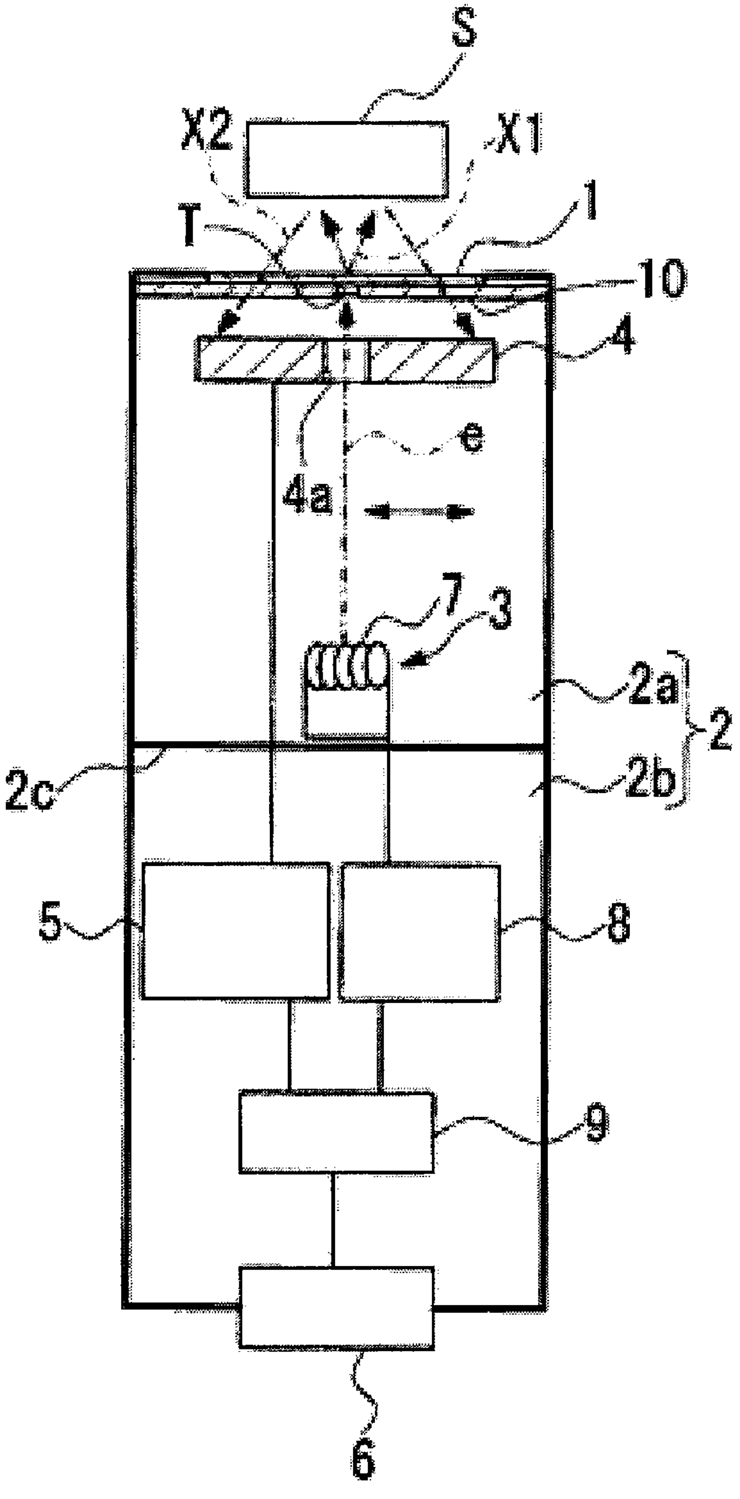
FIG. 1 is a schematic block diagram of a first embodiment of an X-ray analysis apparatus associated with the present invention, showing the whole construction of the apparatus.

A first embodiment of X-ray tube and X-ray analysis apparatus associated with the present invention is hereinafter described by referring to FIGS. 1 and 2. In the various figures of the drawings which will be referenced below, various members are drawn to change scale such that they have recognizable sizes or easily recognizable sizes.

The X-ray analysis apparatus of the present embodiment is a handy energy-dispersive fluorescent X-ray analysis apparatus. As shown in FIG. 1, the apparatus has a vacuum enclosure 2 provided with a window 1, an electron beam source 3 mounted inside the enclosure 2 and emitting an electron beam e, a target T mounted over a central portion of the window 1, an X-ray detector device 4 disposed in the vacuum enclosure 2 such that the detector device can detect fluorescent X-rays and scattering X-rays X2 which enter from the window 1 after being released from a sample S, a metallic thermal and electrical conductor portion 10 mounted over a part of the window 1, an analyzer 5, and a display portion 6 for displaying the results of analysis performed by the analyzer 5. A part of the inside of the vacuum enclosure 2 is evacuated to a vacuum. The window 1 of the enclosure 2 is made of an X-ray transmissive film through which X-rays can be transmitted. The target T produces primary X-rays X1 when irradiated with the electron beam e. The target is so disposed that the primary X-rays X1 can be ejected at the outside sample S through the window 1. The target T is smaller in outside diameter than the window 1. The X-ray detector device 4 outputs a signal carrying information about energies of the fluorescent X-rays and scattering X-rays X2. The thermal and electrical conductor portion 10 extends from the target T to the vacuum enclosure 2. The analyzer 5 analyzes the signal from the detector device 4. The X-ray tube is chiefly made of the vacuum enclosure 2, electron beam source 3, target T, and X-ray detector device 4.

The vacuum enclosure 2 is made of a front accommodation portion 2*a* and a rear accommodation portion 2*b* partitioned from the front accommodation portion 2*a* by a partition wall 2*c*. The inside of the front accommodation portion 2*a* is in a vacuum state, while the inside of the rear accommodation portion 2*b* is in an atmospheric state.

The window 1 is made of an X-ray transmissive film that is fabricated, for example, from foil of Be (beryllium). A thin film or sheet of a metal (copper (Cu), zirconium (Zr), or Mo) selected according to the sample S may be mounted as a primary filter on the front surface of the window 1. The window 1 and target T are placed at ground potential or positive potential.

The thermal and electrical conductor portion 10 is made of a flat sheet material of Ta (tantalum) or Cu (copper). As shown in FIG. 2, the conductor portion includes two belt-like portions each extending from the target T to the vacuum enclosure 2. The conductor portion 10 is adhesively bonded to the inner surface of the window 1. In FIG. 2, the thermal and electrical conductor portion 10 is hatched to facilitate understanding. The belt-like portions of the conductor portion 10 are close in outside diameter to the target T. One end of each belt-like portion of the conductor portion 10 is contacted with and held to the target T. The belt-like portions of the conductor portion 10 extend left and right from the target T. The other ends are held to the inner surface of the vacuum enclosure 2.

The electron beam source 3 includes a filament 7 acting as a cathode and a current-voltage control portion 8 for controlling the voltage (tube current) between the filament 7 and the target T acting as an anode as well as the electrical current (tube current) of the electron beam e. Thermionic electrons (electron beam) produced from the filament 7 acting as the cathode are accelerated by the voltage applied between the filament 7 and the target T acting as the anode and collide against the target T, producing X-rays. In this way, the electron beam source 3 acts to generate the primary X-rays.

The cathode may be made of carbon nanotubes instead of the filament 7.

The target T is made of W (tungsten), Mo (molybdenum), Cr (chromium), Rh (Rhodium), or other material. The target T is disposed close to the window 1 or contacted with it.

The X-ray detector device 4 is a semiconductor detector device such as a silicon device made, for example, of a PIN diode. When one X-ray photon hits the detector device 4, a corresponding current pulse is produced. The instantaneous current value of the current pulse is in proportion to the energy of the incident fluorescent X-ray.

Figure 2:
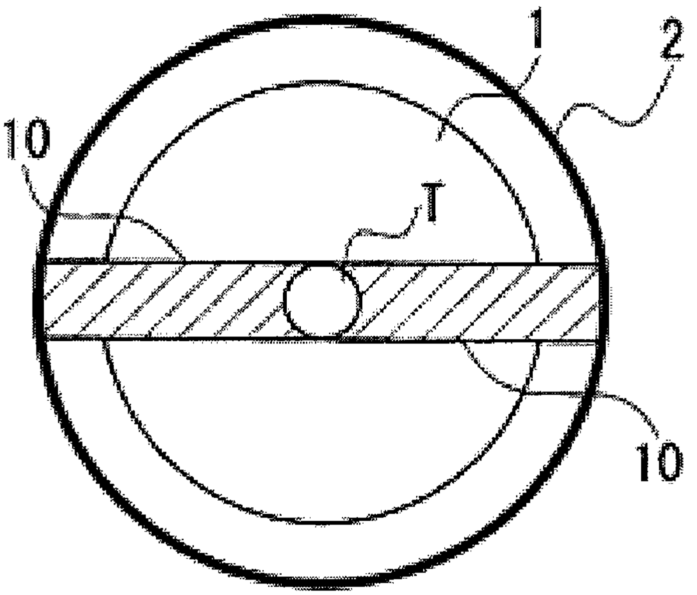
FIG. 2 is a front elevation of main portions inside the vacuum enclosure of the first embodiment, showing the positional relationships among the window, target, and thermal and electrical conductor portion.

The X-ray detector device 4 is disposed in a region located between the filament 7 of the electron beam source 3 and the target T as shown in FIG. 1. The detector device 4 has a transmissive hole 4*a* through which the electron beam e can be transmitted. The target T is disposed immediately under and close to the transmissive hole 4*a*. The radiation-sensitive surface of the detector device 4 is disposed around the target T.

The X-ray detector device 4 is held at a constant temperature by a cooling mechanism (not shown) such as a cooling mechanism using liquefied nitrogen as a refrigerant or a cooling mechanism using Peltier elements. The surroundings of the transmissive hole 4*a* of the X-ray detector device 4 are shielded with a metal plate to prevent the primary X-rays X1 and electron beam e from hitting the radiation-sensitive surface. A metallic shielding member (not shown) may be mounted between the target T and the X-ray detector device 4 to prevent the primary X-rays X1 from the target T, secondary electrons, and backscattered electrons from hitting the detector device 4.

Incidence of thermionic electrons (electron beam e) on the X-ray detector device 4 can be suppressed by placing the detector device 4 at a negative potential.

The filament 7, target T, X-ray detector device 4, and thermal and electrical conductor portion 10 are disposed within the front accommodation portion 2*a* of the vacuum enclosure 2.

The analyzer 5 is an X-ray signal-processing portion that is a multi-channel pulse height analyzer which converts the current pulse generated by the X-ray detector device 4 into a voltage pulse, amplifies it, and takes it as a signal. Then, the analyzer obtains the pulse height of the voltage pulse from the signal and creates an energy spectrum.

The current-voltage control portion 8 and analyzer 5 are connected with a CPU 9 and provide various kinds of control according to settings.

The display device 6 is made, for example, of a liquid crystal display and connected with the CPU 9. Various screens can be displayed on the display portion as well as the results of analysis such as an energy spectrum, according to settings.

The analyzer 5, current-voltage control portion 8, and CPU 9 are mounted in the rear accommodation portion 2*b* of the vacuum enclosure 2. The display portion 6 is so disposed that the display screen is placed on the outer surface of the rear accommodation portion 2*b*. That is, the analyzer 5 and display portion 6 are mounted integrally in the vacuum enclosure 2.

Those portions of the above-described various components which need to be supplied with electric power and which require setting of potentials are connected with a power supply (not shown).

In this way, in the present embodiment, the X-ray detector device 4 is disposed in the vacuum enclosure 2 in such a way that the device 4 can detect fluorescent X-rays and scattering X-rays X2 entering from the window 1. Therefore, the X-ray detector device 4 is integrally accommodated within the vacuum enclosure 2 together with the electron beam source 3 and target T. Consequently, the whole apparatus can be made smaller in size and weight. The X-ray detector device 4 is disposed within the vacuum enclosure 2. The detector device can be placed closer to the sample S together with the target T producing the primary X-rays X1. Under this condition, detection can be performed. Hence, excitation and detection can be performed very efficiently. Especially, where the present invention is applied to an open handy type, efficient detection is enabled. Therefore, if the amount of produced X-rays is suppressed, X-rays can be detected with high sensitivity. High safety can be achieved.

Because the radiation-sensitive surface of the X-ray detector device 4 is disposed around the target T, when an analysis is performed while the sample S is placed close to the window 1, fluorescent X-rays produced from the sample S in response to the primary X-rays X1 from the target T can be efficiently detected by the X-ray detector device 4 disposed around the target T (i.e., near the window 1).

The metallic thermal and electrical conductor portion 10 is mounted over a part of the window 1 and extends from the target T to the vacuum enclosure 2. Therefore, electric charge created by the target T in the center of the window 1 and produced heat are transmitted through the thermal and electrical conductor portion 10 and dissipate away to the vacuum enclosure 2. Fluorescent X-rays are entered from the portions of the window 1 not covered with the target T or thermal and electrical conductor portion 10, and are transmitted through the sample at a high transmissivity. The X-rays can be detected with the inside X-ray detector device 4. Accordingly, temperature rise of the target T can be suppressed and charging can be reduced by the thermal and electrical conductor portion 10. Fluorescent X-rays can be detected with high efficiency from the portions of the window 1 not covered with the target T or thermal and electrical conductor portion 10.

The apparatus is designed as a portable apparatus in which the analyzer 5 and display portion 6 are integrally mounted in the vacuum enclosure 2. Therefore, the results of analysis can be checked on the spot, using the analyzer 5 and display portion 6. Furthermore, the apparatus can be designed as a small-sized, lightweight handy type.

Figure 3:
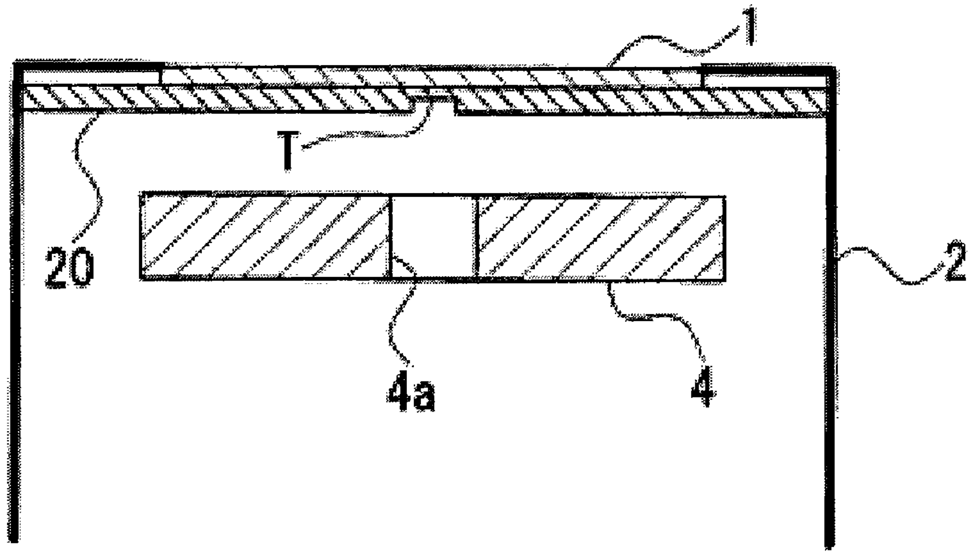
FIG. 3 is a schematic cross section of main portions of a second embodiment of the X-ray analysis apparatus associated with the invention.

A second embodiment of the X-ray tube and X-ray analysis apparatus associated with the present invention is next described by referring to FIG. 3. In the description of the following embodiments, the same components are indicated by the same reference numerals as in the description of the above embodiment and their description is omitted below.

The second embodiment is different from the first embodiment as follows. In the first embodiment, the thermal and electrical conductor portion 10 made of a plate material of Ta (tantalum) or Cu (copper) is disposed on the inner surface of the window 1. In contrast, in the X-ray tube and X-ray analysis apparatus of the second embodiment, the thermal and electrical conductor portion 20 is made of the same material as the target T as shown in FIG. 3, e.g., W (tungsten). In the second embodiment, the thermal and electrical conductor portion 20 is made thicker than the target T.

That is, in the second embodiment, after the thermal and electrical conductor portion 20 is fabricated, for example, from the same material as the target T and shaped in a substantially rectangular form, the central portion is thinned by etching or other method, thus fabricating the target T. Another fabrication method is also available. In particular, the target T made of a thin film is fabricated by vapor deposition or sputtering using a metal mask such that primary X-rays X1 are efficiently produced from the target T when the electron beam e hits the target T over the window 1. To permit electric charge created by the target T and generated heat to be dissipated away easily, the thermal and electrical conductor portion 20 is fabricated as a thick film by a similar film formation method using another metal mask having an opening slightly narrower than the target. At this time, the thermal and electrical conductor portion 20 of the thick film overlaps a part of the circumferential portion of the target T. A further fabrication method is also available. The target T is placed in the center of the window 1. The thermal and electrical conductor portion 20 is made of a pair of band-plate members thicker than the target T. The band-plate members may be mounted on the opposite sides of the target T. One end of each band-plate portion is in contact with the target T, while the other end is contacted with the vacuum enclosure 2.

In this way, in the second embodiment, the thermal and electrical conductor portion 20 is made of the same material as the target T and located over the window 1. Therefore, it is not necessary to prepare a separate material as the thermal and electrical conductor portion 20. Hence, the material cost can be reduced. Furthermore, because the thermal and electrical conductor portion 20 thicker than the target T is adopted, higher electrical and thermal conductivities are obtained. X-rays can be produced efficiently with the thin target T.

Figure 4:
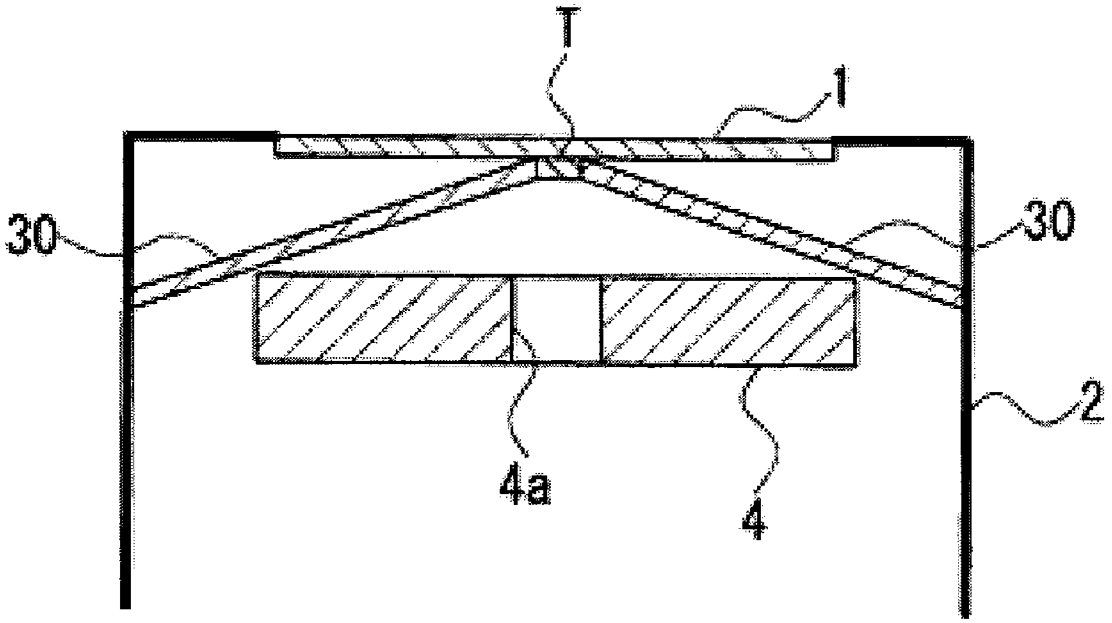
FIG. 4 is a schematic cross section of main portions of a third embodiment of the X-ray analysis apparatus associated with the invention.

A third embodiment of the X-ray tube and X-ray analysis apparatus associated with the present invention is next described by referring to FIG. 4.

The third embodiment is different from the first embodiment as follows. In the first embodiment, the thermal and electrical conductor portion 10 made of belt-like plate materials is directly bonded to the inner surface of the window 1. In contrast, in the X-ray tube and X-ray analysis apparatus of the third embodiment, one end of each portion of a thermal and electrical conductor portion 30 is fixed to the target T as shown in FIG. 4. The conductor portion 30 extends obliquely relative to the inner surface of the window 1 from the target T to the vacuum enclosure 2. The other end is fixed to the vacuum enclosure 2.

That is, in the third embodiment, the other end of each portion of the thermal and electrical conductor portion 30 is floated over the window 1 and extends obliquely. The thermal and electrical conductor portion 30 can be shaped like belts, lines, or rods. The thermal and electrical conductor portion 30 may be made of metal lines fabricated by wire bonding.

It is to be understood that the technical scope of the present invention is not limited to the above embodiments. Rather, various modifications can be made without departing from the gist of the invention.

For example, in the above embodiments, the two thermal and electrical conductor portions 10, 20, or 30 made of two belt-like or rod-like members are mounted on the window 1. The conductor may be made of one belt- or rod-like member. Alternatively, the conductor may be made of three or more belt- or rod-like members. Furthermore, the thermal and electrical conductor portion made of plural belt- or rod-like member may intersect each other or be arranged like a lattice.

In the above embodiments, the apparatus is an energy-dispersive fluorescent X-ray analysis apparatus. The apparatus may also be other analysis apparatus such as a wavelength-dispersive fluorescent X-ray analysis apparatus.

The present invention is preferably applied to handy X-ray analysis apparatus as in the above embodiments. The invention can also be applied to a stationary X-ray analysis apparatus. For example, a stationary X-ray analysis apparatus may be built in such a way that it includes an X-ray tube made up of the vacuum enclosure 2, electron beam source 3, target T, and X-ray detector device 4 and that the analyzer 5, control system, and display portion 6 are separate from the X-ray tube.

What is claimed is:

1. An X-ray tube comprising:

a vacuum enclosure having a vacuum inside and a window made of an X-ray transmissive film through which X-rays are transmitted;

an electron beam source mounted inside the vacuum enclosure and emitting an electron beam;

a target mounted over the window and irradiated with the electron beam to thereby produce primary X-rays which are ejected at an external sample through the window, the target being smaller in outside diameter than the window;

an X-ray detector device disposed inside the vacuum enclosure and acting to detect fluorescent X-rays and scattering X-rays entering from the window after being released from the sample and to output a signal carrying information about energies of the fluorescent X-rays and scattering X-rays; and a metallic thermal and electrical conductor portion mounted over a part of the window and extending from the target to the vacuum enclosure.

2. The X-ray tube set forth in claim 1, wherein said thermal and electrical conductor portion is made of the same material as the target and located over the window.

3. The X-ray tube set forth in claim 2, wherein said thermal and electrical conductor portion is made thicker than the target.

4. An X-ray analysis apparatus comprising:

an X-ray tube as set forth in claim 1;

an analyzer for analyzing said signal; and a display portion for displaying results of analysis performed by the analyzer.

5. The X-ray analysis apparatus set forth in claim 4, wherein said analyzer and said display portion are mounted in the vacuum enclosure.

* * * * *